G. C. TAFT.

Letter Copying-Presses.

No. 5,417. Reissued May 20, 1873.

*Witnesses*

James H. Bancroft

J. B. Sibley

*Inventor*

Geo. C. Taft

AM. PHOTO-LITHOGRAPHIC CO. N.Y. (OSBORNE'S PROCESS)

UNITED STATES PATENT OFFICE.

GEORGE C. TAFT, OF WORCESTER, MASSACHUSETTS.

IMPROVEMENT IN LETTER-COPYING PRESSES.

Specification forming part of Letters Patent No. 28,020, dated April 24, 1860; reissue No. 5,417, dated May 20, 1873; application filed April 9, 1873.

*To all whom it may concern:*

Be it known that I, GEORGE C. TAFT, of Worcester, in the county of Worcester and State of Massachusetts, have invented certain new and useful Improvements in Letter-Copying Presses; and I do hereby declare that the following is a full, clear, and exact description thereof, reference being had to the accompanying drawing making part of this specification, wherein—

Figure 1:
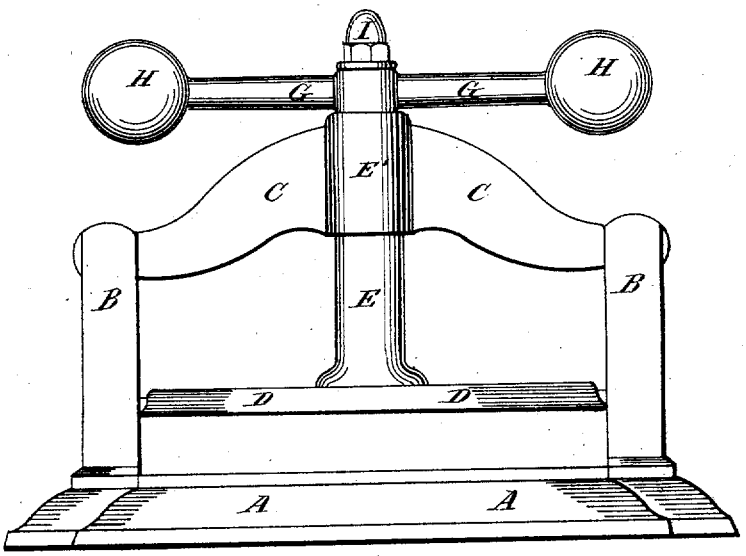
Figure 2:
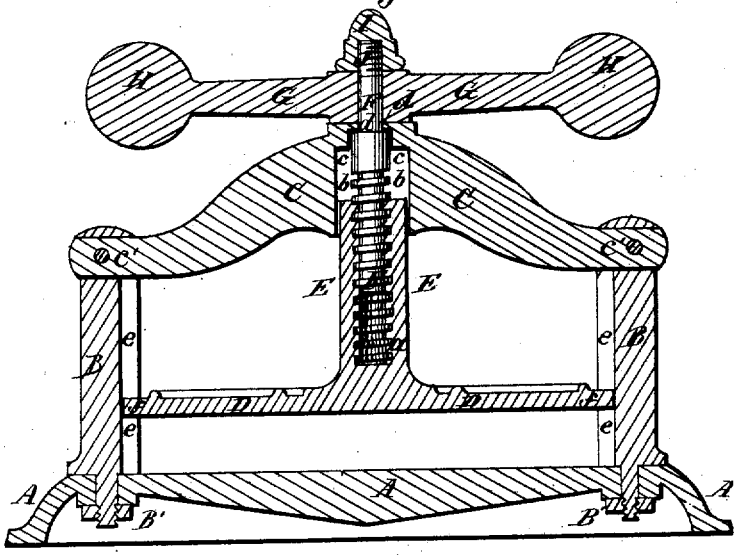

Figure 1 is a side view of my improved press; and Fig. 2 is a section taken through the center of the press.

Similar marks of reference denote the same parts.

Heretofore it has been usual to cast the platen of copying presses in one piece, and the socket receiving the end of the screw in a second piece and bolt them together. This increases the labor of construction, and the platen is not as strong as it would be if the parts were cast in one piece.

The nature of my said invention consists in a copying press formed with a platen upon which is cast a socket for receiving the end of the screw, and I fit the screw beneath a shoulder in the arched cross-piece with a handle above the same, so that the screw will not itself rise and fall as it is rotated, but will operate in the pipe-shaped screw socket to raise or depress the platen.

A is the base, bed, or platen to which the standards B B are fastened by nuts, B′ B′. The standards B B support the arched cross-piece C, and to which they are fastened as shown at *c′ c′*, in Fig. 2. The standards B B are grooved out on their inner sides as shown at *e e*, for the purpose of admitting the lugs *f f* of the platen D. A tubular or socket piece, E, is cast with and forms a part of the platen D. The socket-piece E is smoothed on the outside, but has a female screw, *a*, on the interior surface thereof, and which is formed by a core of sand so that after the platen is taken from the mold, all that is necessary to do to fit the female screw *a* for the reception of the male screw F, is simply to run a tap of the proper size up and down a few times in the socket-piece E for the purpose of removing the roughness of the screw. The arched cross-piece C is provided with a hollow cylindrical enlargement E′, the interior *b* of which is traversed by the socket-piece E of the platen D. (See Fig. 2.) To the upper end of the male screw F is attached the operating lever G (which is provided at each end with a ball, H,) by means of the cap-nut and screw J.

The operation is as follows, viz: The book containing the letter to be copied being placed between the platen D and the bed A the platen is forced down by turning the screw F, the shoulder *d* striking against a shoulder in the arch cross-piece C. When the platen is raised the socket or tubular part of the platen rises up until it strikes against the shoulder C.

By adopting the plan which I have devised for making letter-copying presses, they can be manufactured at greatly reduced prices, while at the same time they are not liable to get out of repair, nor are any of the parts easily detached. When the press is not in use the screws are completely secured against injury from dust or from any other cause consequent upon their being exposed to view. The tubular part E of the platen D can be cast quite thin and light since there is no danger of splitting it, as but little force is necessary in order to remove the roughness of the screw *a*, while the expense of construction is very much less than it would be if the screw *a* had to be formed by boring and tapping.

What I claim, and desire to secure by Letters Patent, is—

1. The copying-press platen D and socket E, cast in one piece, and in which the opening for the screw is cast, substantially as set forth.

2. I claim the socket *b* in the arch cross-piece C, in combination with the screw-socket E and screw F, as and for the purposes set forth.

Dated this 25th day of March, A. D. 1867.

GEO. C. TAFT.

Witnesses:
JAMES H. BANCROFT,
J. B. SIBLEY.